United States Patent [19]
Nanba et al.

[11] 3,810,208
[45] May 7, 1974

[54] PHOTOGRAPHIC CAMERA SCENE BRIGHTNESS INDICATOR

[75] Inventors: Yasuhiro Nanba; Masayoshi Sahara, both of Osaka, Japan

[73] Assignee: Minolta Camera Kabushiki Kaisha, Osaka, Japan

[22] Filed: July 2, 1973

[21] Appl. No.: 375,772

[30] Foreign Application Priority Data
June 30, 1972 Japan.................................. 47-65047

[52] U.S. Cl. .............................................. 95/10 CT
[51] Int. Cl. ........................................... G03b 7/08
[58] Field of Search ...................... 95/10 CE, 10 CT

[56] References Cited
UNITED STATES PATENTS
3,745,902  7/1973  Taguchi........................ 95/10 CE X
3,709,113  1/1973  Wood............................... 95/10 CT

*Primary Examiner*—Samuel S. Matthews
*Assistant Examiner*—Michael L. Gellner
*Attorney, Agent, or Firm*—Watson, Cole, Grindle & Watson

[57] ABSTRACT

In a photographic camera wherein a shutter is controlled or a shutter speed is indicated by output signals generated according to a quantity of scene light received by light receptive elements and a film sensitivity setting, and, in addition thereto if necessary, a diaphragm aperture setting, an electric circuit is responsive only to signals relating to the scene brightness for indicating whether the scene brightness is lower or higher than a predetermined critical level.

9 Claims, 3 Drawing Figures

FIG. I

PHOTOGRAPHIC CAMERA SCENE BRIGHTNESS INDICATOR

BACKGROUND OF THE INVENTION

This invention relates to circuitry for generating scene brightness signals, and more particularly to such circuitry in a photographic camera equipped with a light measuring circuit for producing output signals which are generated accoreing to a quantity of scene light received by light receptive elements and a film sensitivity setting and, in addition thereto if necessary, a diaphragm aperture setting for detecting and indicating whether the scene brightness is within or outside the light measurable range of the light measuring circuit.

Heretofore, devices are known having an indicating device for giving a warning when the scene brightness is outside the range where photographing is permissible and, more specifically, when the scene brightness is lower than the level of the light measurable range. The best known indication device is of the type wherein the low scene brightness is indicated by utilizing either the movement of an ammeter pointer for indicating a shutter speed within the field of view of the finder, or the movement of an ammeter pointer for indicating a diaphragm aperture setting.

In such known indication devices, because the movement of the ammeter pointer for indicating a value of shutter speed is computed according to film sensitivity and diaphragm aperture settings in relation to the scene brightness, the ammeter indication does not represent only that quantity of light received by the light measuring circuit. Accordingly, the mark for giving a warning of the low scene brightness must be shifted within the finder in association with the film sensitivity or a diaphragm aperture adjusting member so that the relation between the warning mark and the ammeter pointer movement corresponds only with the quantity of light received by the light measuring circuit. Otherwise, as in the case of using a fixed warning mark, the ammeter itself must be rotated in accordance with the film sensitivity and the movement of the diaphragm aperture adjusting member.

Mechanical means are required for shifting the warning mark and rotating the ammeter itself, thereby increasing the mechanical complexity and total size of the camera, and requiring a lot of time in assembling and adjustment of the camera, and is the cause of trouble when the camera is subjected to external impact, resulting in decreased reliability.

Another type of indication device is known in which a light measuring circuit for independently measuring scene brightness is used, and the signal outputs of the circuit indicate whether or not the scene brightness is within the proper range. This type of indication device, however, is accompanied with another disadvantage in that it cannot directly indicate the shutter speed as a function of the measured scene brightness, the film sensitivity and the diaphragm aperture as adjusted for photographing.

OBJECTS OF THE INVENTION

This invention is intended to eliminate the aforementioned disadvantages of the conventional photographic camera.

Accordingly, it is an object of this invention to provide a photographic camera wherein a light measuring circuit includes a pair of light receptive elements for receiving scene light to manually or automatically adjust shutter speed to a proper value depending upon the scene brightness, film sensitivity and diaphragm aperture settings for photographing and which is capable of indicating whether the scene brightness is higher or lower than a predetermined level.

Another object of this invention is to provide a scene brightness indicator in a photographic camera of the aforedescribed type in which, if the scene brightness is in an improper range for the camera to function, a luminous element is switched on or off, thereby indicating the improper scene brightness.

A further object of this invention is to provide a photographic camera wherein, either in the case where light receptive elements in a light measuring circuit receive scene light entering a diaphragm aperture set for photographing, or in the case where the light receptive elements receive scene light entering the diaphragm aperture its full position, the shutter speed is properly adjusted in dependence on the scene brightness, the film sensitivity and diaphragm aperture settings, and wherein whether or not the scene brightness is within the proper range is indicated.

These and other objects of this invention will be apparent from the following description of a preferred embodiment of this invention.

SUMMARY OF THE INVENTION

The above objects are attained in a photographic camera including a light measuring circuit which generates outputs according to a quantity of scene light impinging on light receptive elements and a film sensitivity setting, and additionally, if necessary, a diaphragm aperture setting, thereby adjusting shutter speed in accordance with the light measuring circuit outputs. The photographic camera further includes a scene brightness indicating device having first and second output terminals producing therebetween a potential difference as a function of the intensity of light impinging on the light receptive elements in the light measuring circuit; an indicating circuit including a differential amplifier switching circuit receiving the voltage produced at the output terminals; and a luminous element switched on or off by the output of the differential amplifier switching circuit. Thus, if the scene brightness becomes improper and the potential difference across the output terminals is decreased to a level lower than a predetermined level, the differential amplifier switching circuit controls the luminous element to provide an indication that the scene brightness is unacceptable.

DETAILED DESCRIPTION OF THE INVENTION

Figure 1:
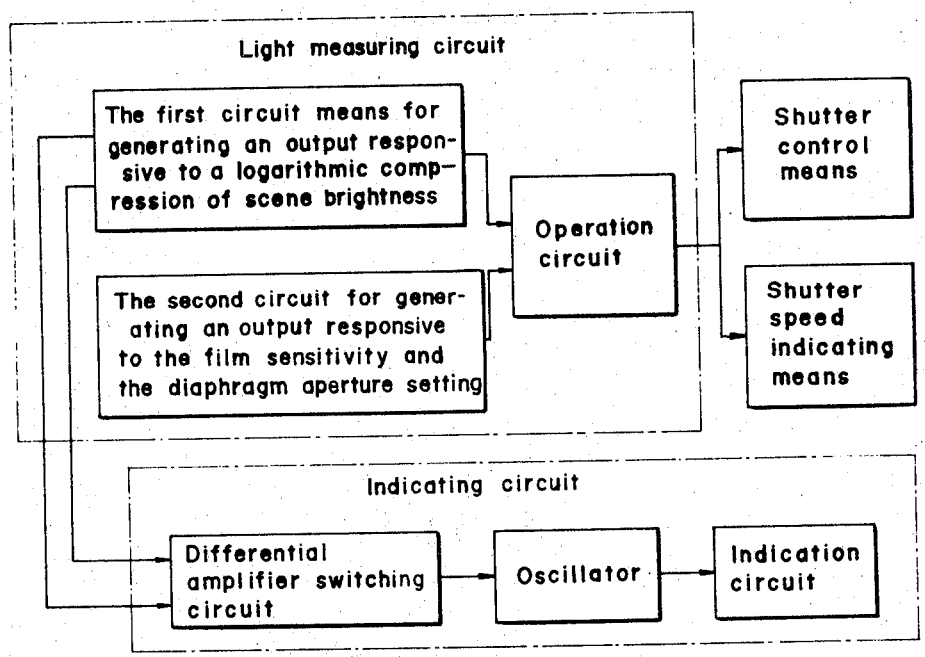
FIG. 1 is a block diagram representation of this invention.

With respect to FIG. 1, the first circuit means generates an output signal which is a logarithmic compression of scene brightness as measured by a light receptive element or elements. The second circuit generates an output in response to film sensitivity and diaphragm aperture settings. The respective outputs from the first and second circuits are fed to the operation circuit which combines the two output signals to generate a signal for operating the shutter control means to determine proper exposure in accordance with the scene brightness, the film sensitivity and the diaphragm aperture settings. The exposure control is performed by a shutter control means. Additionally, the signal output from the operation circuit also operates the shutter speed indicating means.

All of the above mentioned circuits are well known to those skilled in the art of electronically operated shutter exposure control mechanisms. The first circuit, the second circuit and the operation circuit are normally included in a light measuring circuit as indicated by the broken line enclosing those circuits in FIG. 1.

In accordance with the present invention the first circuit includes an additional pair of output terminals which are connected to a differential amplifier switching circuit. The differential amplifier switching circuit actuates an oscillator, which in turn operates an indication circuit. The differential amplifier switching circuit, the oscillator and the indication circuit comprise an indicating circuit illustrated at the bottom of FIG. 1 by the broken line.

One of the terminals of the pair of independent terminals from the first circuit provides a reference potential and the other terminal thereof produces a potential dependent solely upon the light measured by the light receptive elements.

Figure 2:
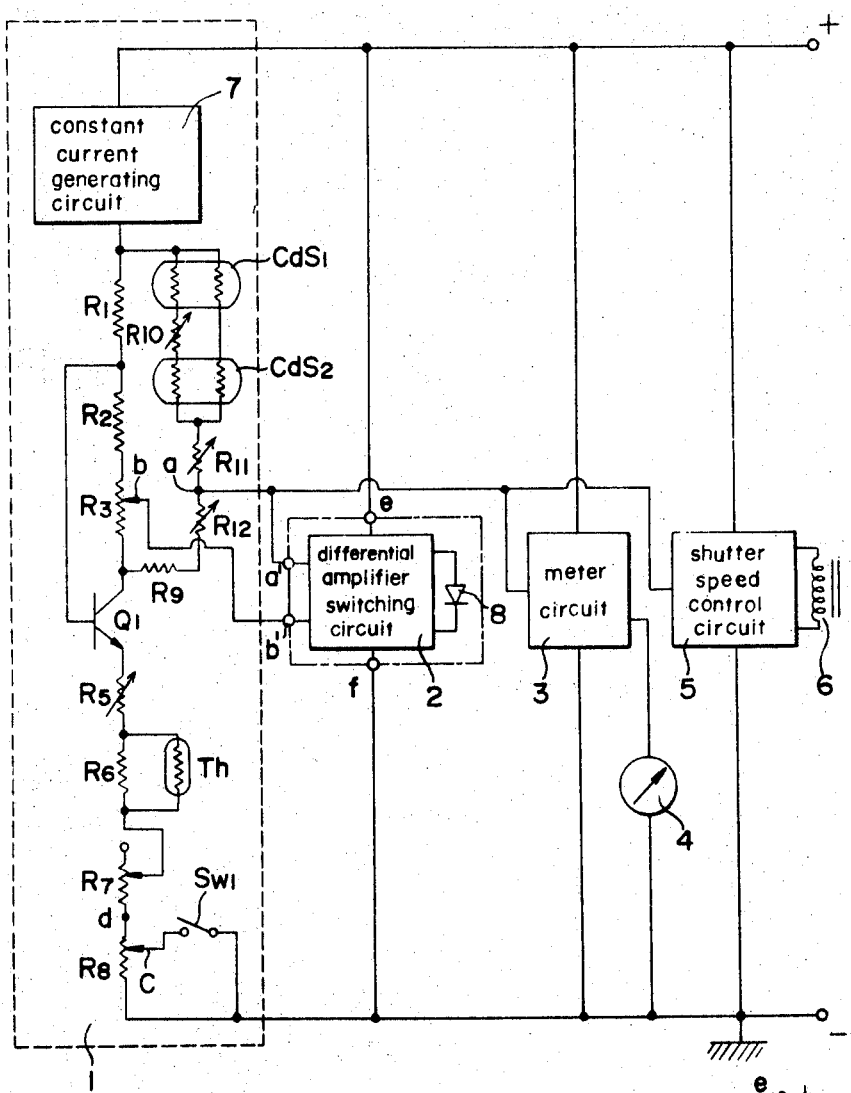
FIG. 2 is a combined block diagram and circuit schematic of a light measuring circuit, a switching circuit connected to the light measuring circuit, a meter circuit and an indicating circuit according to a preferred embodiment of this invention.

The structure and operation of the apparatus will be apparent from FIG. 2 which shows a preferred embodiment of the invention.

In FIG. 2, light measuring circuit 1, enclosed by a broken line, is the light measuring circuit shown in block diagram form in FIG. 1; block 2, also enclosed by a chain line, is the indicating circuit of FIG. 1. Meter circuit 3 actuates ammeter 4 which indicates shutter speed and is responsive to output at terminal $a$ in light measuring circuit 1 which represents the output from the operation circuit illustrated in FIG. 1. Meter circuit 3 and ammeter 4 correspond to the shutter speed indicating means illustrated in FIG. 1. Shutter speed control circuit 5 controls the camera shutter mechanism to determine the proper exposure in accordance with the output at terminal $a$ of light measuring circuit 1. Electromagnet 6 retains a shutter closing mechanism for terminating the exposure and is responsive to shutter speed control circuit 5. Shutter speed control circuit 5 and electromagnet 6 comprise the shutter control means illustrated in FIG. 1. The structure and operation of meter circuit 3, ammeter 4, and shutter speed control circuit 5 are well known to the art so that no additional description of those components is necessary for an understanding of the invention.

Constant current generating circuit 7 is connected to one pole of a power source. Light measuring circuit 1 includes fixed resistors R1, Rz, potentiometer R3 having variable terminal $b$, transistor Q1 having a collector connected to potentiometer R3 and an emitter connected to variable resistor R5. Resistor R6 is connected to the variable terminal of potentiometer R7 and potentiometer R8 is connected to potentiometer R7 and the other terminal of the power source. The aforementioned components are all serially connected to one another between constant current generating circuit 7 and the other pole of the power source. A pair of light receptive elements $CdS1$ and $CdS2$ consisting of two composite photoconductive elements each having two photoresistance elements, are interconnected by resistor R10 as shown in FIG. 2. Light receptive element CdS2 is connected to the collector of transistor Q1 by the series connected resistor R9 and variable resistors R11, R12. Output terminal $a$ of light measuring circuit 1 is formed at the junction of variable resistors R11, R12. The serially connected light receptive elements CdS1, CdS2, variable resistors R11, R12, and resistor R9 are parallelly connected across the serially connected resistors R1, R2, R3. Connected in parallel with resistor R6 is thermistor T$h$. The base of transistor Q1 is connected to the junction between resistors R1 and R2.

Potentiometer R7 provides a signal representing the film sensitivity setting for the light measuring circuit and is constructed so that it provides a fixed voltage per Ev. The sliding element of potentiometer R7 interlocks with the film sensitivity setting means to set its resistance. The higher the film sensitivity is set, the larger the resistance between the sliding element and point $d$. The feature of the resistance of potentiometer R7 is that it is linear relative to the movement of the sliding element. Since a constant current is fed to potentiometer R7 from the constant current power source, as the setting means for the film sensitivity varies its setting value 1 Ev, the sliding element of potentiometer R7 slides or rotates along the resistance thereof a predetermined length or angle, respectively, and the potential difference between the sliding element and point $d$ varies by a predetermined quantity. Potentiometer R8 provides a signal representing the diaphragm aperture setting during photographing for the light measuring circuit and sliding terminal C thereof is connected through switch SW1 to that terminal of potentiometer R8 which is connected to the power source, whereby the resistance between sliding terminal C and the power source are short-circuited by the closing of swifch SW1.

when light receptive elements $CdS1$, $CdS2$ receive scene light passing through the diaphragm aperture at its full open position for effecting the light measurement (hereinafter referred to as light measurement at the open position), switch SW1 is closed such that the potential at junction $d$ between potentiometers R7 and R8 varies according to the movement of sliding element C by a fixed voltage with respect to the variation of 1 Ev in the diphragm aperture. The resistance between point C of potentiometer R8 and point $d$ decreases the more the diaphragm aperture is stopped-down. That is to say, as the diaphragm aperture is stopped-down by 1 Ev, sliding element C slides or rotates toward point $d$ a predetermined length or angle, respectively. Therefore, the potential at point $d$ is lowered by a specific voltage per 1 Ev change in the diaphragm aperture setting and is increased by that specific voltage for a 1 Ev increase in the diaphragm aperture setting. In contrast thereto, when light receptive elements $CdS1$, $CdS2$ receive scene light passing through the diaphragm aperture adjusted to a setting suited for photographing to effect the light measurement (hereinafter referred to as the light measurement at a diaphragm aperture setting), switch SW1 is opened so that there is no variation in the potential at junction $d$ either during the light measurement or at the time of exposure.

It is necessary that the potential at junction $a$ accurately represent the scene brightness, the film sensitivity and/or diaphragm aperture setting. It is readily apparent that light measuring circuit 1, as described above, provides such a potential at junction $a$. First, if the signal generated by light receptive element CdS1, CdS2 is ignored, it is evident that the potential at junction $a$ accurately represents the variation of either, or both, film sensitivity and diaphragm aperture settings because variations in those settings appear at the emitter of transistor Q1 and the variations of the emitter potential are reflected in the collector current of transistor Q1. The value of resistors R1, R2, R3, the resistance of variable resistors R11, R12 and the impedance of light receptive elements CdS1, CdS2 are selected so that the potential at junction $a$ changes in a fixed proportion to the change in the emitter potential of transistor Q1. Such operation is well known to those skilled in the art. Secondly, if the emitter potential of transistor Q1 is assumed to be fixed (that is, there is no variation of either the film sensitivity or the diaphragm aperture setting) the potential at junction $a$ will vary to accurately reflect the light impinging on light receptive element CdS1, CdS2. Thus, the potential at junction $a$ accurately indicates scene brightness, film sensitivity setting and/or diaphragm aperture setting.

As the shutter speed is determined by three factors consisting of scene brightness, film sensitivity and diaphragm aperture settings, the potential difference between ground potential and the potential at junction $a$ is used as an input to meter circuit 3 for actuating the shutter speed indicating meter 4 and shutter speed control circuit 5. However, it is apparent that the potential at junction $a$ cannot be used to accurately indicate whether or not the scene brightness is within the light measurable range because the output voltage at junction $a$ includes the film sensitivity and/or diaphragm aperture settings. Accordingly, another output terminal is provided by sliding terminal $b$ of potentiometer R3, so as to produce a potential difference between terminals $a$ and $b$, which potential difference provides a signal for indicating that the scene brightness is outside the light measurable range. Junctions $a$ and $b$ are both in the collector circuit of transistor Q1 such that if the collector potential of transistor Q1 varies the potentials at junctions $a$ and $b$ change in a fixed ratio.

Resistors R1, R2 and R3 are selected such that their composite resistance is low in comparison with the composite resistance of the circuit consisting of light receptive elements CdS1, CdS2, variable resistors R10, R11 and R12 and resistor R9. Therefore, the collector potential of transistor Q1, as well as the potential at terminal $b$ of potentiometer R3, is substantially unaffected by the changing resistance of light receptive elements CdS1, CdS2 with different light impingement thereon. Because of the aforesaid resistance relationships, the collector current of transistor Q1 primarily flows through resistors R1, R2 and R3. As described above, the collector current of transistor Q1 is changed in accordance with the emitter potential, which in turn is changed by the film sensitivity and/or the diaphragm aperture settings. Consequently, the collector potential of transistor Q1, as well as the potential of terminal $b$, is varied only as a function of the film sensitivity and/or the diaphragm aperture settings.

As previously described above, the potential at junction $a$ varies in accordance with scene brightness, film sensitivity and/or diaphragm aperture settings. Also, it is evident from the above description that the potential at terminal $b$ is unaffected by scene brightness, but varies in accordance with the film sensitivity setting and/or the diaphragm aperture setting, as well as the position of terminal $b$ along the resistance of potentiometer R3. In other words, the potential difference between terminals $a$ and $b$ is dependent only upon the quantity of light received by light receptive elements CdS1, CdS2. Thus, since the potential difference between terminals $a$ and $b$ reflects only the changing level of scene brightness, that potential difference can be used to indicate whether the scene brightness is within or without the light measurable range.

The purpose of potentiometer R3 is to adjust the potential level between terminals $a$ and $b$ so that a potential difference (independent of the quantity of detected light) is produced between the collector of transistor Q1 and terminal $b$ so that if the quantity of received light is outside the light measurable range, either below or above the light measurable range, differential amplifier switching circuit 2 may be actuated to switch light emitting diode 8 on or off.

While output terminal $a$ has been provided at the junction between variable resistors R11, R12 and terminal $b$ has been provided on potentiometer R3, it is obvious from the above description of the operation of light measuring circuit 1, that terminals $a$ and $b$ may be provided at other positions in their respective branches of the collector circuit of transistor Q1. The primary consideration, of course, is to locate terminals $a$ and $b$ so that the potential difference between them corresponds only to the quantity of light measured by light receptive elements CdS1 and CdS2.

In the embodiment shown in FIG. 2, the potential of terminal $a$ is normally set at a higher level relative to the potential of terminal $b$, and terminal $b$ is adjusted so that with a decrease in the quantity of received light, the potential at terminal $a$ gradually decreases, and when the quantity of light reaches the lower level of the marginal level of the light measurable range the potential difference between terminals $a$ and $b$ becomes zero. Thus, a warning indication can be provided that the scene brightness is lower than the light measurable range. Obviously, the potential difference between terminals $a$ and $b$ may be set so that for a given quantity of light relative to the collector potential of transistor Q1, a warning indication can be provided that the scene brightness is higher than the light measurable range.

The potential difference between terminals $a$ and $b$ is provided to terminals $a'$, $b'$ of differential amplifier switching circuit 2. The following description is taken with respect to FIG. 3 which shows the circuitry comprising the differential amplifier switching circuit, the oscillator, and the indication circuit shown in FIGS. 1 and 2.

The differential amplifier circuit consists of transistors Q2, Q3 having their bases respectively connected to terminals $b'$ and $a'$. Resistor R14 is connected between the collectors of transistors Q2, Q3. Resistor R13 connects the emitters of transistors Q2, Q3 to positive terminal e of a power source. Transistors Q4, Q5 have their collectors respectively connected to the collectors of transistors Q2, Q3. The bases of transistors Q4, Q5 are interconnected to each other as well as to the collector or transistor Q4, and this connection also short-circuits the base-collector of transistor Q4. The emitters of transistors Q4 and Q5 are connected to negative terminal f of the power source, which in the embodiment illustrated in FIG. 3 is grounded.

The base of transistor Q6 is connected to junction g through resistors R15, R16. The collector of transistor Q6 is connected through resistor R17 to the base of transistor Q7. The emitter of transistor Q6 is connected to junction i and to ground through capacitor C2. The emitter of transistor Q7 is connected to positive terminal e of the power source and the collector of that transistor is connected to the anode of light emitting diode 8. The cathode of light emitting diode is connected to junction h and to ground through serially connected resistors R19, R20. Junction h is connected to junction j, between resistors R15, R16, by capacitor C1. Junction i is connected to the junction between resistors R19, R20 by resistor R18.

Figure 3:
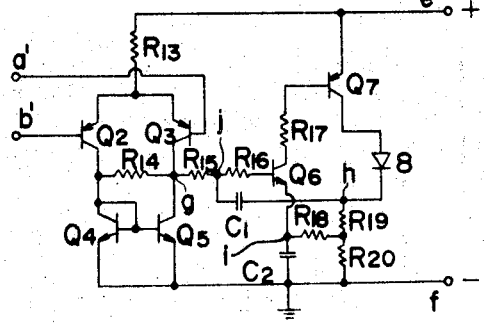
FIG. 3 is a schematic of the indicating circuit including the differential amplifier switching circuit in the embodiment of FIG. 2.

The operation of the differential amplifier switching circuit, oscillator, and indication circuit of FIG. 3 is as follows. From the above description, if the scene brightness is within the light measurable range, the potential of terminal $a'$ is higher than the terminal $b'$ (which is the normal case as it infrequently happens that the quantity of light is excessively high). Thus, transistor Q2 is maintained conductive while transistor Q3 is maintained non-conductive because a relatively large current flows to the emitter of transistor Q4 which produces a comparatively high voltage between the base-emitter of transistor Q4. Therefore, the base-emitter of transistor Q5 is biased to a greater extent in the forward direction, thereby decreasing the unsaturated resistance between the collector and emitter of transistor Q5. This consequently lowers the collector potential of transistor Q5 at junction g. In this situation, light emitting diode 8 remains non-conductive for reasons which will be more fully described below.

With a decrease in the potential at terminal $a'$, current begins to flow between the emitter and collector of transistor Q3, resulting in a decrease in the current flow to transistor Q2. Consequently, the bias of transistor Q5 provided by transistor Q4 is decreased, thereby increasing the resistance between the collector and emitter of transistor Q5, and also the collector potential thereof (the potential at junction g). When the potential at terminal $a'$ becomes lower than terminal $b'$, The aforedescribed condition of transistors Q2 and Q3 is rapidly inverted, thereby rendering transistor Q2 non-conductive and transistor Q3 conductive. Thus, the collector potential at junction g increases so that capacitor C1 is charged through resistor R15. It is noted that resistor R14 is interposed between the collectors of transistors Q2 and Q3 to control the excessive increase in the collector potential of transistor Q5 and suitably adjust the potential at junction g. With the charging of capacitor C1, current is fed through resistor R16 to the base of transistor Q6, thereby causing current to flow in the collector of transistor Q6, whereby transistor Q7 is made conductive to energize light emitting diode 8. Consequently, the potential at junction h between luminous diode 8 and resistor R19 rises to increase the potential at junction j between resistors R15, R16 through capacitor C1. This tends to cause transistor Q6 to saturate. In the meantime, capacitor C2 is charged by the emitter current of transistor Q6 to preclude current flowing through resistors R18, R19, whereby the potential at junction i begins to increase.

Transistor Q6 becomes non-conductive during that period when an upper critical voltage of the rising voltage of capacitor C2 and the raised potential at junction j are discharged through resistors R15, R16 to a lower stable voltage. Accordingly, transistor Q7 is also made non-conductive, thereby de-energizing light emitting diode 8. Thus, the voltage of capacitor C2 is discharged through resistors R18 and R20 to lower the potential at junction i to a given potential. Current flow to transistor Q6 is then again initiated, whereby transistor Q6 tends to saturate to again energize light emitting diode 8.

The aforedescribed cyclic oscillation of the on/off operation of light emitting diode 8 is determined by the proper selection of the resistance of resistors R15, R16, R18, R19 and R20 as well as the capacitance of capacitors C1, C2. Further, multivibrators of types well known to those skilled in the art may also be used to provide the necessary cyclic oscillation. However, such multivibrators continuously consume power as either of the two transistor stages is alternatively maintained conductive during its operation. In contradistinction thereto, in the oscillation circuit described above as illustrated in FIG. 3, power is only consumed when the indication element is in its operative state. When the indication element is inoperative, the current flow to the oscillation circuit is cut off. In other words, current is intermittently fed to the oscillation circuit only as required to energize the indicating element, which conserves power. Thus, as described above, the on/off oscillation of the indicating element not only conserves power but also enhances the warning effect to a greater extent than would a continuous indication.

What is claimed is:

1. A scene brightness indicating device for use in a photographic camera having a first circuit means including light receptive elements and producing first output signals dependent upon the quantity of light received by said light receptive elements; a second circuit means for producing second output signals as a function of exposure setting parameters; an operation circuit responsive to said first and second output signals for producing third output signals representing a value of exposure time, and means responsive to said third output signals; the improvement comprising:

said first circuit means including a pair of output terminals for providing a potential difference therebetween depending only upon the scene brightness;

a transistor switching circuit having input terminals respectively connected to said pair of output terminals for producing fourth output signals depending upon said potential difference; and indicating means actuated by said fourth output signals.

2. A scene brightness indicating device as in claim 1, wherein said transistor switching circuit comprises a differential amplifier; and said indicating means comprises an oscillation circuit controlled by said differential amplifier for producing oscillation signals, and a light emitting element turned on or off by said oscillation signals.

3. In a scene brightness indicating device as in claim 2, wherein said differential amplifier comprises a first transistor, a second transistor having its collector connected to the collector of said first transistor, a third transistor, and a fourth transistor having its collector connected to the collector of said third transistor and having its base short-circuited to the collector of said third transistor, said second transistor having its base connected to the base of said fourth transistor.

4. In a scene brightness indicating device as in claim 3, further comprising;
a fixed resistor connected between the collectors of said first and third transistors.

5. In a scene brightness indicating device as in claim 4, wherein said differential amplifier switching circuit further comprises;
a fifth transistor and at least two resistors connected in series with each other, said fifth transistor having its base connected to the collector of said first transistor through said at least two resistors;
a sixth transistor having its base connected to the collector of said fifth transistor;
a first capacitor connected to the emitter of said fifth transistor;
a light-emitting diode having an anode connected to the collector of said sixth transistor;
two fixed resistors connected in series with each other and connected to the cathode of said light-emitting diode;
a fixed resistor connected between the emitter of said fifth transistor and the junction between said two fixed resistors; and
a second capacitor having one terminal connected to the cathode of said light-emitting diode and the other terminal connected to a junction point between two additional fixed resistors connected in series with each other and connected between the collectors of said first and second transistors and the base of said fifth transistor.

6. In a scene brightness indicating device as in claim 3, wherein said differential amplifier switching circuit comprises;
a fifth transistor and at least two resistors connected in series with each other, said fifth transistor having its base connected to the collector of said first transistor through said at least two resistors;
a sixth transistor having its base connected to the collector of said fifth transistor;
a first capacitor connected to the emitter of said fifth transistor;
a light-emitting diode having an anode connected to the collector of said sixth transistor;
two fixed resistors connected in series with each other and connected to the cathode of said light-emitting diode;
a fixed resistor connected between the emitter of said fifth transistor and the junction between said two fixed resistors; and
a second capacitor having one terminal connected to the cathode of said light-emitting diode and the other terminal connected to a junction point between two additional fixed resistors connected in series with each other and connected between the collectors of said first and second transistors and the base of said fifth transistor.

7. In a scene brightness indicating device as in claim 6, wherein said first circuit means comprises a constant current generating circuit connected to a potential source, a bleeder circuit consisting of at least two resistors connected in series with each other and connected to the output of said constant current generating circuit, a transistor having its collector connected to said bleeder circuit and its base impressed with a bleeder voltage from said bleeder circuit, a first variable resistor connected in series with the emitter of said transistor and having a resistance determined by the film sensitivity setting, a second variable resistor having a resistance determined by the diaphragm aperture setting, light receptive elements connected in series with each other across said bleeder circuit, and a fixed resistor; a first terminal of said pair of output terminals formed at a junction between light receptive elements and said fixed resistor, and a said second terminal of said pair of output terminals formed at said bleeder circuit between the base and collector of said transistor.

8. In a scene brightness indicating device as in claim 1, wherein said first circuit means comprises a constant current generating circuit connected to a potential source, a bleeder circuit consisting of at least two resistors connected in series with each other and connected to the output of said constant current generating circuit, a transistor having its collector connected to said bleeder circuit and its base impressed with a bleeder voltage from said bleeder circuit, and a fixed resistor; said second circuit means comprises a first variable resistor connected in series with the emitter of said transistor and having a resistance determined by the film sensitivity setting, a second variable resistor having a resistance determined by the diaphragm aperture setting; said light receptive elements are connected in series with each other across said bleeder circuit; a first terminal of said pair of output terminals formed at a junction between said light receptive elements and said fixed resistor, and said second terminal of said pair of output terminals formed at said bleeder circuit between the base and collector of said transistor.

9. In a scene brightness indicating device as in claim 7, wherein said differential amplifier switching circuit comprises;
a fifth transistor and at least two resistors connected in series with each other, said fifth transistor having its base connected to the collector of said first transistor through said at least two resistors;
a sixth transistor having its base connected to the collector of said fifth transistor;
a first capacitor connected to the emitter of said fifth transistor;
a light-emitting diode having an anode connected to the collector of said sixth transistor;
two fixed resistors connected in series with each other and connected to the cathode of said light-emitting diode;
a fixed resistor connected between the emitter of said fifth transistor and the junction between said two fixed resistors; and
a second capacitor having one terminal connected to the cathode of said light-emitting diode and the other terminal connected to a junction point between two additional fixed resistors connected in series with each other and connected between the collectors of said first and second transistors and the base of said fifth transistor.

* * * * *